(12) United States Patent
Sakaihara et al.

(10) Patent No.: US 10,744,760 B2
(45) Date of Patent: Aug. 18, 2020

(54) IMAGE PROCESSING APPARATUS, PRINTING SYSTEM, AND IMAGE PROCESSING METHOD

(71) Applicant: SEIKO EPSON CORPORATION, Tokyo (JP)

(72) Inventors: Shun Sakaihara, Shiojiri (JP); Naoki Maruyama, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/213,503

(22) Filed: Dec. 7, 2018

(65) Prior Publication Data

US 2019/0176465 A1 Jun. 13, 2019

(30) Foreign Application Priority Data

Dec. 8, 2017 (JP) ................. 2017-235822

(51) Int. Cl.
| | |
|---|---|
| B41J 2/045 | (2006.01) |
| B41J 2/205 | (2006.01) |
| B41J 2/21 | (2006.01) |
| H04N 1/401 | (2006.01) |
| H04N 1/405 | (2006.01) |

(52) U.S. Cl.
CPC ........... *B41J 2/0456* (2013.01); *B41J 2/0458* (2013.01); *B41J 2/04508* (2013.01); *B41J 2/04581* (2013.01); *B41J 2/04586* (2013.01); *B41J 2/04593* (2013.01); *B41J 2/2054* (2013.01); *B41J 2/2121* (2013.01); *H04N 1/4015* (2013.01); *H04N 1/4057* (2013.01)

(58) Field of Classification Search
CPC .... B41J 2/0456; B41J 2/0458; B41J 2/04593; B41J 2/2121; B41J 2/2054; B41J 2/04581; B41J 2/04508; B41J 2/04586; H04N 1/4015; H04N 1/4057
See application file for complete search history.

(56) References Cited

U.S. PATENT DOCUMENTS

2005/0122354 A1* 6/2005 Yamane ............... B41J 2/04505
347/11

FOREIGN PATENT DOCUMENTS

| | | |
|---|---|---|
| JP | 2009-226801 A | 10/2009 |
| JP | 2015-147304 A | 8/2015 |

* cited by examiner

*Primary Examiner* — Sharon A. Polk
(74) *Attorney, Agent, or Firm* — Foley & Lardner LLP

(57) ABSTRACT

An image processing apparatus configured to generate, based on image data corresponding to a printing image, print data for causing a printer to execute printing includes an input unit (input device, display device) configured to receive, for each of the first ink and the second ink, an ink discharge correction volume for correcting an ink volume discharged from predetermined nozzles among a plurality of first nozzles and a plurality of second nozzles, and a print data generating unit (printer driver) configured to generate the print data based on the image data and the ink discharge correction volume input.

8 Claims, 12 Drawing Sheets

92

| BEFORE CORRECTION | 0 | 1 | 2 | ····· | 200 | ····· | 254 | 255 |
|---|---|---|---|---|---|---|---|---|
| NOZZLE 1 | 0 | 1 | 2 | ····· | 190 | ····· | 244 | 245 |
| NOZZLE 2 | 0 | 1 | 2 | ····· | 185 | ····· | 239 | 240 |
| NOZZLE 3 | 0 | 1 | 2 | ····· | 200 | ····· | 254 | 255 |
| , | . | . | . | . | . | . | . | . |
| , | . | . | . | . | . | . | . | . |
| , | . | . | . | . | . | . | . | . |
| NOZZLE n | 0 | 1 | 2 | ····· | 190 | ····· | 244 | 245 |
| NOZZLE n + 1 | 0 | 1 | 2 | ····· | 195 | ····· | 254 | 255 |
| , | . | . | . | . | . | . | . | . |

| BEFORE CORRECTION | 0 | 1 | 2 | ..... | 200 | ..... | 254 | 255 |
|---|---|---|---|---|---|---|---|---|
| NOZZLE 1 | 0 | 1 | 2 | ..... | 190 | ..... | 244 | 245 |
| NOZZLE 2 | 0 | 1 | 2 | ..... | 185 | ..... | 239 | 240 |
| NOZZLE 3 | 0 | 1 | 2 | ..... | 200 | ..... | 254 | 255 |
| . | . | . | . | . | . | . | . | . |
| . | . | . | . | . | . | . | . | . |
| . | . | . | . | . | . | . | . | . |
| NOZZLE n | 0 | 1 | 2 | ..... | 190 | ..... | 244 | 245 |
| NOZZLE n + 1 | 0 | 1 | 2 | ..... | 195 | ..... | 254 | 255 |
| . | . | . | . | . | . | . | . | . |

92A

| BEFORE CORRECTION | 0 | 1 | 2 | ····· | 200 | ····· | 254 | 255 |
|---|---|---|---|---|---|---|---|---|
| NOZZLE 1 | 0 | 1 | 2 | ····· | 190 | ····· | 244 | 245 |
| NOZZLE 2 | 0 | 1 | 2 | ····· | 185 | ····· | 239 | 240 |
| NOZZLE 3 | 0 | 1 | 2 | ····· | 200 | ····· | 254 | 255 |
| . | . | . | . | . | . | . | . | . |
| . | . | . | . | . | . | . | . | . |
| . | . | . | . | . | . | . | . | . |
| NOZZLE n | 0 | 1 | 2 | ····· | 171 | ····· | 299 | 245 |
| NOZZLE n+1 | 0 | 1 | 2 | ····· | 195 | ····· | 254 | 230 |
| . | . | . | . | . | . | . | . | . |

Fig. 8

IMAGE PROCESSING APPARATUS, PRINTING SYSTEM, AND IMAGE PROCESSING METHOD

BACKGROUND

1. Technical Field

The invention relates to an image processing apparatus, a printing system, and an image processing method involving printing carried out by discharging ink onto a printing medium.

2. Related Art

A printing apparatus such as an inkjet printer includes nozzles configured to discharge ink and forms (prints) a printing image by discharging ink onto a printing medium on the basis of print data received from an image processing apparatus employing a computer or the like. Here, the print data is image data being a base of a printing image subjected to image processing such as halftone processing. Note that the halftone processing refers to processing (so-called digitization) of converting pre-conversion tone values of image data into post-conversion tone values being tone values corresponding to dots formed by a printing apparatus on a printing medium.

Such an inkjet printer uses a printing head including arrays of multiple head units provided with nozzle rows of multiple ink nozzles to support high definition, high speed, and a wide format.

In a case where a plurality of head units are assembled to constitute a printing head, there is a problem of streaks of uneven density that may be caused in a printing image owing to a difference in ink discharge characteristics among the head units and owing to variation in precision of attachment positions among the head units to deteriorate printing quality.

For example, in a case where owing to variation in precision of the attachment positions among the head units, the arrays of the ink nozzles are disrupted at positions (connections of the head units) where end regions of the head units adjacent to each other overlap each other, streaks of uneven density (banding) along the connections are caused in a printing image.

Thus, as a technique of suppressing such uneven density and enhancing image quality of a printing image, a method such as BRS correction processing is known. The BRS correction processing refers to processing of correcting a discharged ink volume (density tone value), and includes measuring uneven density caused and correcting an ink volume to be discharged to cancel out the uneven density on the basis of the measurement data. The BRS correction processing is described in, for example, JP-A-2009-226801.

Specifically, in the BRS correction processing, first, before shipment of a manufactured printing apparatus, a special pattern for measuring uneven density is printed to measure the printing results (uneven density) with a scanner. Next, on the basis of the measurement results, a correction volume of an ink volume is determined to cancel out the uneven density caused, and a BRS correction table including ink volumes (density tone values) obtained before and after the correction in correlation with each other for each nozzle is prepared, and the prepared BRS correction table is stored in a memory of the printing apparatus. In printing, an image processing apparatus configured to generate print data corrects dot ratio data (dot generation rate) for determining density of a printing image with reference to the BRS correction table stored in the printing apparatus. The image processing apparatus generates the print data on the basis of the corrected dot ratio data.

Furthermore, JP-A-2015-147304 describes a technique of further correcting, on the basis of an adjustment amount of density of an image input to an input unit provided in a printing apparatus (printer), uneven density that cannot not be corrected fully by such BRS correction processing.

However, in the printing apparatus (printer) described in JP-A-2015-147304, since the adjustment (correction) is collectively performed on all ink used by the printing apparatus, there has been an issue of adjustment (correction) that cannot be performed in consideration of coloring characteristics of each ink color and mechanical characteristics of each head unit.

Furthermore, since a region to be subjected to the adjustment (correction) is limited to a printing region where the head units overlap each other, there has also been an issue of uneven density that is caused in other regions and that cannot be adjusted (corrected).

SUMMARY

The invention has been made to address at least some of the above-described issues and can be realized as the following application examples or modes.

APPLICATION EXAMPLE 1

An image processing apparatus according to this application example is an image processing apparatus configured to generate, based on image data corresponding to a printing image, print data for causing a printing apparatus to carry out printing to execute printing, the printing apparatus including a first printing head including a plurality of first nozzles configured to discharge onto a printing medium first ink for carrying out printing of the printing image and a second printing head including a plurality of second nozzles configured to discharge onto the printing medium second ink for carrying out the printing, and the image processing apparatus includes an input unit configured to receive, for each of the first ink and the second ink, an ink discharge correction volume for correcting an ink volume discharged by predetermined nozzles among the plurality of first nozzles and the plurality of second nozzles, and a print data generating unit configured to generate the print data based on the image data and the ink discharge correction volume input.

The image processing apparatus according to this application example is an image processing apparatus configured to generate, based on image data corresponding to a printing image, print data for causing a printing apparatus to execute printing, the printing apparatus including a first printing head including a plurality of first nozzles configured to discharge onto a printing medium first ink for carrying out printing of the printing image and a second printing head including a plurality of second nozzles configured to discharge onto the printing medium second ink for carrying out the printing.

Furthermore, the image processing apparatus according to this application example includes an input unit configured to receive, for each of the first ink and the second ink, an ink discharge correction volume for correcting an ink volume discharged by predetermined nozzles among the plurality of first nozzles and the plurality of second nozzles, and a print data generating unit configured to generate the print data based on the image data and the ink discharge correction volume input.

According to this application example, since a correction value (ink discharge correction volume) for carrying out appropriate correction of uneven printing caused by predetermined nozzles can be input in printing, correction can be carried out accurately. Furthermore, since the ink discharge correction volume can be input for each of the first ink and the second ink (for example, for each ink color), appropriate correction (correction more appropriate than correction according to the related art) can be carried out in accordance with characteristics of the ink.

APPLICATION EXAMPLE 2

In the image processing apparatus according to the above-described application example, the predetermined nozzles to be corrected are nozzles specified by an input from the input unit.

According to this application example, since the predetermined nozzles to be corrected are nozzles specified by an input from the input unit, uneven printing such as banding caused at any position can be corrected.

APPLICATION EXAMPLE 3

In the image processing apparatus according to the above-described application example, the first printing head provided in the printing apparatus and to be corrected includes a plurality of first head units each including the plurality of first nozzles, the second printing head provided in the printing apparatus and to be corrected includes a plurality of second head units each including the plurality of second nozzles, and the predetermined nozzles to be corrected are nozzles corresponding to a first overlap region in which print regions where the first head units adjacent to each other carry out printing overlap each other and a second overlap region in which print regions where the second head units adjacent to each other carry out printing overlap each other.

According to this application example, the image processing apparatus is configured to correct a printing image of the printing apparatus including the first printing head including a plurality of first head units each including the plurality of first nozzles and the second printing head including a plurality of second head units each including the plurality of second nozzles. Furthermore, the predetermined nozzles to be corrected are nozzles corresponding to a first overlap region in which print regions where the first head units adjacent to each other carry out printing overlap each other and a second overlap region in which print regions where the second head units adjacent to each other carry out printing overlap each other.

According to this application example, since the nozzles corresponding to the overlap regions (connection regions) where the two head units adjacent to each other carry out printing are the predetermined nozzles to be corrected, uneven printing such as banding caused in the overlap regions can be corrected more appropriately.

Since the nozzles corresponding to the overlap regions are defined in advance as the predetermined nozzles to be corrected in correction of uneven printing (banding) caused in the overlap regions, it is unnecessary to set again the nozzles to be corrected and thus, correction can be carried out efficiently. Furthermore, since a correction value for carrying out appropriate correction can be input for each type of ink, correction can be carried out more accurately.

APPLICATION EXAMPLE 4

In the image processing apparatus according to the above-described application example, the predetermined nozzles to be corrected are nozzles corresponding to an overlap region selected from a plurality of the first overlap regions and a plurality of the second overlap regions based on an input from the input unit.

According to this application example, the predetermined nozzles to be corrected are nozzles corresponding to an overlap region selected from a plurality of the first overlap regions and a plurality of the second overlap regions based on an input from the input unit. That is, in the case where a printing image includes printing images of a plurality of overlap regions, an overlap region determined to need correction is selected, and appropriate correction can be executed.

APPLICATION EXAMPLE 5

In the image processing apparatus according to the above-described application example, the first printing head provided in the printing apparatus and to be corrected includes a plurality of first head units each including the plurality of first nozzles, the second printing head provided in the printing apparatus and to be corrected includes a plurality of second head units each including the plurality of second nozzles, and the predetermined nozzles to be corrected are nozzles of a head unit selected from the plurality of first head units and the plurality of second head units based on an input from the input unit.

According to this application example, the image processing apparatus is configured to correct a printing image of the printing apparatus including the first printing head including a plurality of first head units each including the plurality of first nozzles and the second printing head including a plurality of second head units each including the plurality of second nozzles. Furthermore, the predetermined nozzles to be corrected are nozzles of a head unit selected from the plurality of first head units and the plurality of second head units based on an input from the input unit.

According to this application example, since the predetermined nozzles to be corrected are nozzles of a head unit selected from the plurality of first head units and the plurality of second head units based on an input from the input unit, uneven printing such as banding depending on a head unit can be corrected more appropriately by, for example, selecting a head unit determined to have different characteristics and to need correction and executing correction.

APPLICATION EXAMPLE 6

In the image processing apparatus according to the above-described application example, the print data generating unit generates the print data based on the image data and a plurality of the ink discharge correction volumes input in accordance with an ink volume per unit area of the ink discharged onto the printing medium.

According to this application example, the print data generating unit generates the print data based on the image data and a plurality of the ink discharge correction volumes input in accordance with an ink volume per unit area of the ink discharged onto the printing medium. Thus, for example, in a case where a degree of necessary correction differs depending on tone of a printing image, more appropriate correction can be carried out in accordance with the tone of the printing image.

APPLICATION EXAMPLE 7

A printing system according to this application example includes a printing apparatus including a first printing head including a plurality of first nozzles configured to discharge onto a printing medium first ink for carrying out printing of a printing image and a second printing head including a plurality of second nozzles configured to discharge onto the printing medium second ink for carrying out the printing, and an image processing apparatus configured to generate print data for causing the printing apparatus to execute printing based on image data corresponding to the printing image, wherein the image processing apparatus includes an input unit configured to receive, for each of the first ink and the second ink, an ink discharge correction volume for correcting an ink volume discharged by predetermined nozzles among the plurality of first nozzles and the plurality of second nozzles, and a print data generating unit configured to generate the print data based on the image data and the ink discharge correction volume input.

The printing system according to this application example includes a printing apparatus including a first printing head including a plurality of first nozzles configured to discharge onto a printing medium first ink for carrying out printing of a printing image and a second printing head including a plurality of second nozzles configured to discharge onto the printing medium second ink for carrying out the printing, and an image processing apparatus configured to generate print data for causing the printing apparatus to execute printing based on image data corresponding to the printing image.

Furthermore, the image processing apparatus includes an input unit configured to receive, for each of the first ink and the second ink, an ink discharge correction volume for correcting an ink volume discharged by predetermined nozzles among the plurality of first nozzles and the plurality of second nozzles, and a print data generating unit configured to generate the print data based on the image data and the ink discharge correction volume input.

According to this application example, since a correction value (ink discharge correction volume) for carrying out appropriate correction of uneven printing caused by predetermined nozzles can be input in printing, correction can be carried out more accurately. Furthermore, since the ink discharge correction volume can be input for each of the first ink and the second ink (for example, for each ink color), more appropriate correction can be carried out in accordance with characteristics of the ink.

APPLICATION EXAMPLE 8

An image processing method according to this application example is an image processing method of generating, based on image data corresponding to a printing image, print data for causing a printing apparatus to execute printing, the printing apparatus including a first printing head including a plurality of first nozzles configured to discharge onto a printing medium first ink for carrying out printing of the printing image and a second printing head including a plurality of second nozzles configured to discharge onto the printing medium second ink for carrying out the printing, the image processing method including receiving, an ink discharge correction volume for correcting an ink volume discharged from predetermined nozzles among the plurality of first nozzles and the plurality of second nozzles, the ink discharge correction volume being input for each of the first ink and the second ink and generating the print data based on the image data and the ink discharge correction volume received.

The image processing method according to this application example is an image processing method of generating, based on image data corresponding to a printing image, print data for causing a printing apparatus to execute printing, the printing apparatus including a first printing head including a plurality of first nozzles configured to discharge onto a printing medium first ink for carrying out printing of the printing image and a second printing head including a plurality of second nozzles configured to discharge onto the printing medium second ink for carrying out the printing to execute printing.

Furthermore, the image processing method according to this application example includes a step of receiving, for each of the first ink and the second ink, an ink discharge correction volume for correcting an ink volume discharged from predetermined nozzles among the plurality of first nozzles and the plurality of second nozzles, and a print data generating step of generating the print data based on the image data and the ink discharge correction volume received.

According to this application example, since a correction value (ink discharge correction volume) for carrying out appropriate correction of uneven printing caused by predetermined nozzles can be input in printing, correction can be carried out more accurately. Furthermore, since the ink discharge correction volume can be input for each of the first ink and the second ink (for example, for each ink color), more appropriate correction can be carried out in accordance with characteristics of the ink.

BRIEF DESCRIPTION OF THE DRAWINGS

The invention will be described with reference to the accompanying drawings, wherein like numbers reference like elements.

FIG. 8 is an explanatory view of a BRS correction table in which correction of an initial correction value is carried out.

DESCRIPTION OF EXEMPLARY EMBODIMENTS

Hereinafter, exemplary embodiments in which the invention is embodied will be described with reference to the accompanying drawings. The following are exemplary embodiments of the invention, and does not limit the invention. Note that in each of the following figures, illustration may be made at dimensions different from the actual dimensions for simplicity.

Exemplary Embodiment 1

Figure 1:
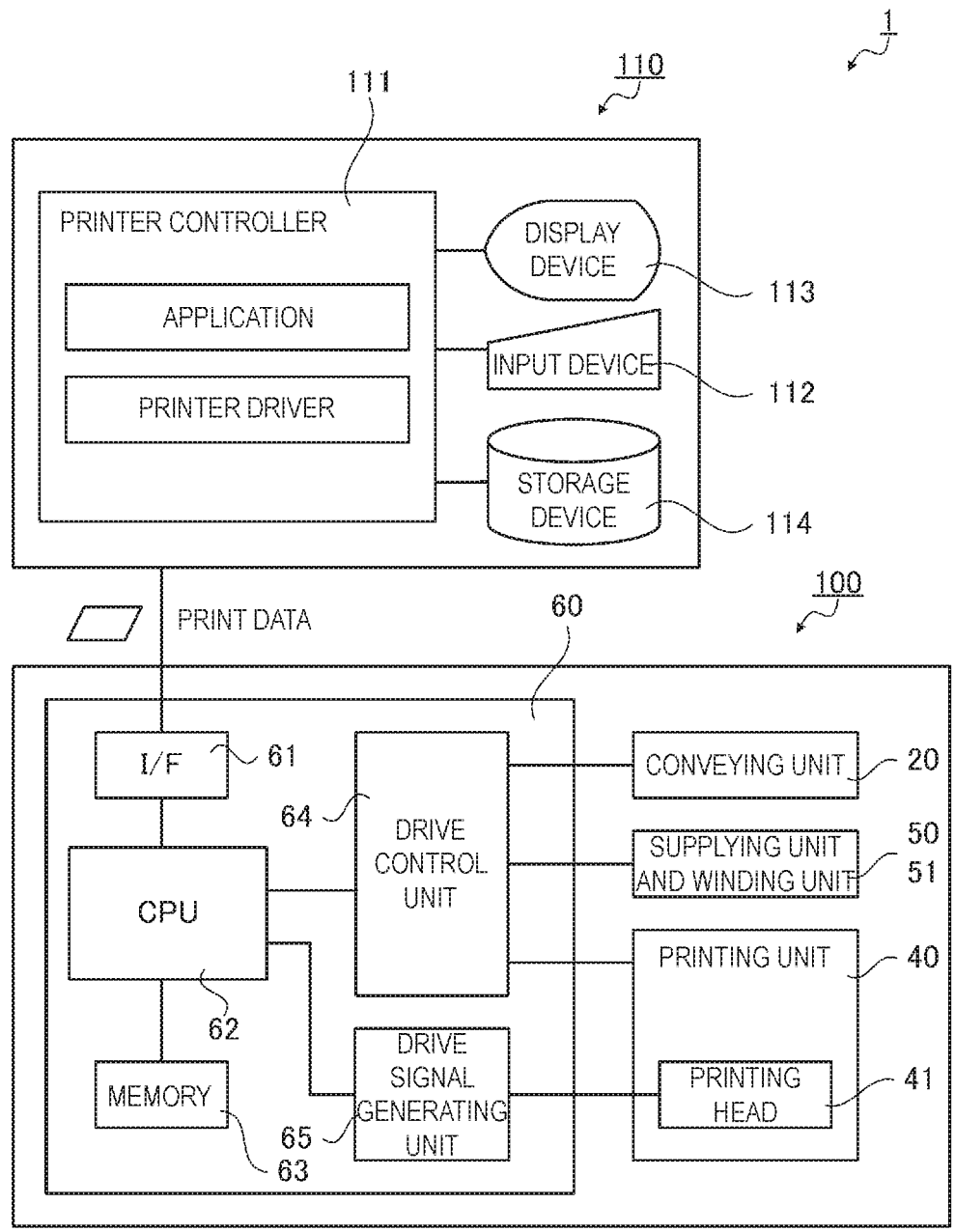
FIG. 1 is a block diagram illustrating a configuration of a printing system according to exemplary embodiment 1.
Figure 2:
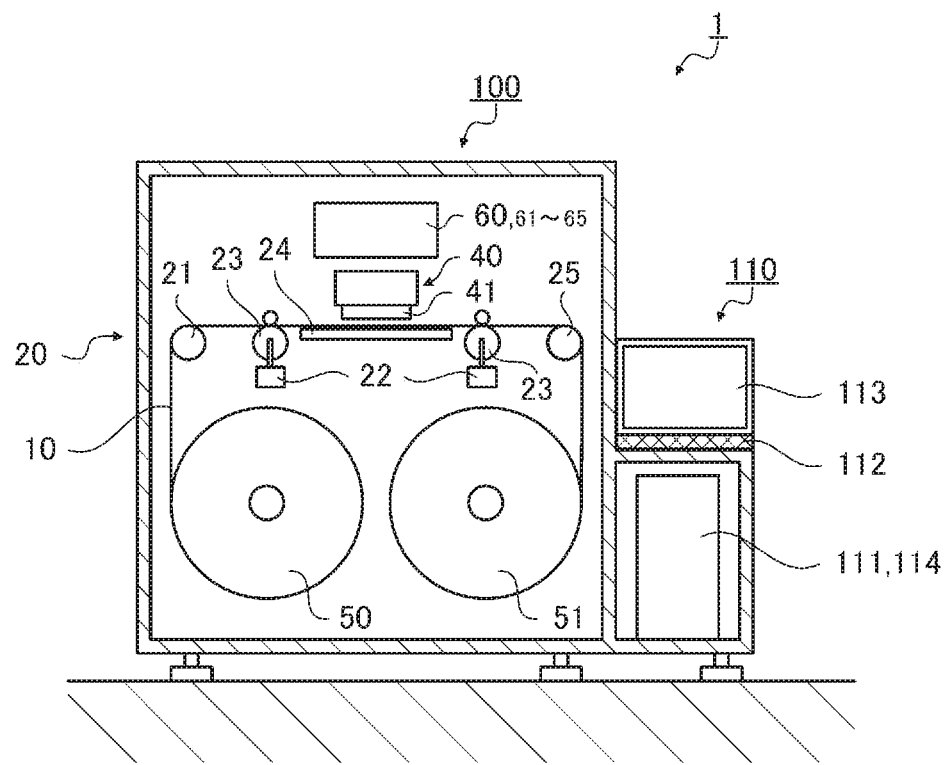
FIG. 2 is a front view of the printing system according to exemplary embodiment 1.

FIG. 1 is a block diagram illustrating a configuration of a printing system 1 according to exemplary embodiment 1, and FIG. 2 is a front view of the printing system 1.

The printing system 1 includes an inkjet printer 100 (hereinafter referred to as a printer 100) as a "printing apparatus" configured to print a printing image on a printing medium 10 elongated and supplied in a form of a wound roll and, a personal computer 110 (hereinafter referred to as a PC 110) as an "image processing apparatus".

Image Processing Apparatus (PC 110)

The PC 110 includes a printer control unit 111, an input device 112, a display device 113, a storage device 114, and the like and generates print data for causing the printer 100 to execute printing on the basis of image data corresponding to a printing image. Furthermore, the PC 110 carries out control of a print job for causing the printer 100 to carry out printing.

The printer control unit 111 includes a CPU (calculating unit) and a storage medium (not illustrated) such as a RAM and a ROM and comprehensively controls all the printing system 1.

The input device 112 is an information input unit serving as a human interface. Specific examples of the input device 112 include a keyboard and a mouse pointer.

The display device 113 is an information displaying unit (display) serving as a human interface, and displays, on the basis of the control of the printer control unit 111, information input from the input device 112, an image to be printed by the printer 100, and information related to a print job.

The input device 112 and the display device 113 constitute an "input unit" configured to receive a predetermined input from the input device 112 while the information displayed by the display device 113 is viewed.

The storage device 114 is a rewritable storage medium such as a hard disk drive (HDD) and a memory card, and stores software for the PC 110 to operate (a program running on the printer control unit 111), information related to an image to be printed and a print job, and the like.

The software for the PC 110 to operate includes typical image processing application software (hereinafter, referred to as an application) and printer driver software (hereinafter, referred to as a printer driver).

Basic Configuration of Printing Apparatus (Printer 100)

The printer 100 includes a conveying unit 20, a printing unit 40, a supplying unit 50, a winding unit 51, and a controller 60. The printer 100 having received print data from the PC 110 controls each operating unit (the conveying unit 20, the printing unit 40, the supplying unit 50, and the winding unit 51) with the controller 60. The controller 60 controls each operating unit on the basis of the print data received from the PC 110 and prints an image (image formation) on the printing medium 10.

The print data is data for image formation acquired by subjecting, for example, typical RGB digital image information acquired by a digital camera or the like to conversion processing to enable printing by the printer 100 with the application and the printer driver provided in the PC 110, and includes a command for controlling the printer 100.

The conveying unit 20, as illustrated in FIG. 2, includes a supplying roller 21, a conveying motor 22, a conveying roller 23, a platen 24, an ejecting roller 25, and the like and constitutes a conveying path for conveying the printing medium 10 from the supplying unit 50 through a printing region located below the printing unit 40 to the winding unit 51. The platen 24 supports the printing medium 10 during printing.

The printing unit 40 has a function of discharging ink as ink droplets on the printing medium 10. The printing unit 40 includes a printing head 41 including a plurality of nozzles configured to discharge ink droplets and constitutes a line head fixed relative to the conveying path.

The printing head 41 can discharge ink droplets of four colors of cyan ink C, magenta ink M, yellow ink Y, and black ink K.

Here, "first ink" in this exemplary embodiment is any type of the four color ink of the cyan ink C, the magenta ink M, the yellow ink Y, and the black ink K, and "second ink" is any type of the four color ink other than the "first ink" of the cyan ink C, the magenta ink M, the yellow ink Y, and the black ink K.

Note that the types of ink and the number of the types of ink used for printing (ink discharged by the printing head) are not limited thereto.

A preferred example of a technique of discharging ink droplets (inkjet technique) is a piezoelectric technique. The piezoelectric technique is a technique of applying pressure corresponding to a print information signal to ink stored in a pressure chamber by a piezoelectric element and ejecting (discharging) ink droplets from nozzles in communication with the pressure chamber to perform printing.

Note that the technique of discharging ink droplets is not limited thereto and may be any other recording technique of ejecting ink in a form of droplets and forming a dot group on a printing medium. For example, the technique may be a technique of forcefully ejecting ink droplets by applying pressure to ink with a small pump and mechanically oscillating nozzles with a quartz oscillator or the like, or a technique (thermal-jet technique) of heating ink with a minute electrode in accordance with a recording information signal to cause the ink to foam, and ejecting ink droplets to perform recording.

The supplying unit 50 rotatably supports a reel on which the printing medium 10 is wounded into a roll, and the supplying unit 50 feeds the printing medium 10 into the conveying path. The winding unit 51 rotatably supports a reel configured to wind the printing medium 10 obtained after completion of printing from the conveying path.

The controller 60 includes an interface unit 61, a CPU 62, a memory 63, a drive control unit 64, a driving signal generating unit 65, and the like, and carries out control of the printer 100. The controller 60 repeats an operation of discharging ink droplets from the printing head 41 and an operation of driving the conveying unit 20, the supplying unit 50, and the winding unit 51 to move the printing medium 10, and an image including a plurality of dots is printed on the printing medium 10.

The interface unit 61 communicates data between the PC 110 and the printer 100.

The CPU 62 is a calculation processing device configured to control all the printer 100.

The memory 63 is a storage medium configured to provide a work region for an operation of a program for the CPU 62 to operate and a region for storing a program and various tables (such as a color conversion look-up table 91, a BRS correction table 92, and an SML table 93 described below) for generation of print data in the PC 110, and includes storage elements such as a RAM and an EEPROM.

The CPU 62 controls each operating unit (the conveying unit 20, the printing unit 40, the supplying unit 50, and the winding unit 51) via the drive control unit 64 in accordance with a program stored in the memory 63 and print data received from the PC 110.

The driving signal generating unit 65 generates a driving signal for driving the piezoelectric element provided in the printing head 41.

Printing Head

Figure 3:
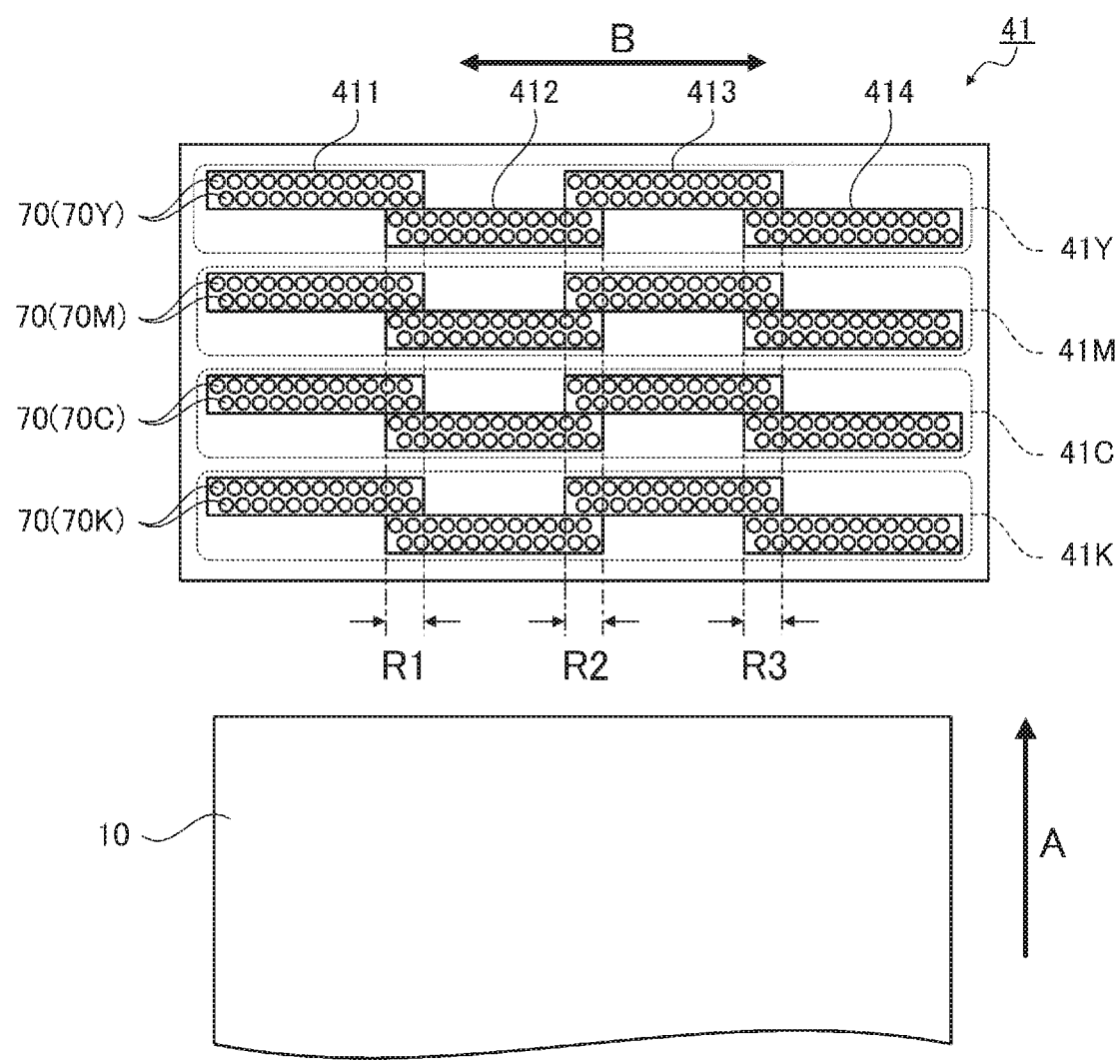
FIG. 3 is an explanatory view schematically illustrating arrays of nozzles in a printing head.

FIG. 3 is an explanatory view schematically illustrating arrays of nozzles in the printing head 41. The printing head 41 is a line-type inkjet head and includes four printing heads 41C, 41M, 41Y, and 41K arrayed at a predetermined interval in a conveying direction A of the printing medium 10.

The printing heads 41C, 41M, 41Y, and 41K each have a length in a sheet-width direction B intersecting the conveying direction A larger than a maximum width of the printing medium 10. The printing head 41K is disposed most upstream in the conveying direction A of the printing medium 10, and the printing head 41C is disposed downstream of the printing head 41K. Furthermore, the printing head 41M is disposed downstream of the printing head 41C, and the printing head 41Y is disposed downstream of the printing head 41M.

Here, a "first printing head" according to this exemplary embodiment is any of the printing heads 41C, 41M, 41Y, and 41K configured to discharge the "first ink", and a "second printing head" is any of the printing heads 41C, 41M, 41Y, and 41K other than the "first printing head" and configured to discharge the "second ink".

Furthermore, "first nozzles" are nozzles provided in the "first printing head", and "second nozzles" are nozzles provided in the "second printing head".

The printing heads 41C, 41M, 41Y, and 41K each include four head units 411 to 414 arrayed in the sheet-width direction B. The four head units 411 to 414 are arranged such that the head units adjacent to each other are disposed back and forth (that is, overlap each other) in the conveying direction A, as illustrated in FIG. 3. Furthermore, the four head units 411 to 414 are each provided with two nozzle rows each including a plurality of nozzles 70 arrayed at a predetermined nozzle pitch in the sheet-width direction B. The printing head 41C is provided with the nozzles 70 (70C) configured to discharge the cyan ink C, and the printing head 41M is provided with the nozzles 70 (70M) configured to discharge the magenta ink M. Furthermore, the printing head 41Y is provided with the nozzles 70 (70Y) configured to discharge the yellow ink Y, and the printing head 41K is provided with the nozzles 70 (70K) configured to discharge the black ink K. The two nozzle rows provided in each of the head units 411 to 414 are disposed at positions in the sheet-width direction B displaced by ½ of a distance between the nozzles adjacent to each other (nozzle pitch).

Here, a "first head unit" according to this exemplary embodiment is a head unit including a plurality of the above-described "first nozzles", and a "second head unit" is a head unit including a plurality of the above-described "second nozzles".

The head units 411 and 412 adjacent to each other in the sheet-width direction B are disposed such that the nozzles 70 in end regions of the head units 411 and 412 overlap each other as viewed in the conveying direction A. Here, among a nozzle disposition region in the head unit 411 and a nozzle disposition region in the head unit 412, regions overlapping each other as viewed in the conveying direction A is defined as an overlap region R1. Similarly, among nozzle disposition regions in the head unit 412 and the head unit 413 adjacent to each other in the sheet-width direction B, regions overlapping each other as viewed in the conveying direction A is defined as an overlap region R2. Further, among nozzle disposition regions in the head unit 413 and the head unit 414 adjacent to each other in the sheet-width direction B, regions overlapping each other as viewed in the conveying direction A is defined as an overlap region R3.

Here, a "first overlap region" in this exemplary embodiment is a region in which printing regions where "first head units" adjacent to each other carry out printing overlap each other, and a "second overlap region" is a region in which printing regions where "second head units" adjacent to each other carry out printing overlap each other.

In this way, the printing head 41 is provided with the three regions in which the nozzle disposition regions of the head units (411 to 414) adjacent to each other overlap each other as viewed in the conveying direction A. In each of the overlap regions R1 to R3, the nozzles 70 are disposed to overlap each other as viewed in the conveying direction A.

In the example illustrated in FIG. 3, an overlap width of each of the overlap regions R1 to R3 is a width in which three nozzles 70 in the end region of one head unit overlap three nozzles 70 in the end region of another head unit overlapping the one head unit. The overlapping width, however, is not limited to such a width.

Basic Function of Image Processing in Printer Driver

Printing on the printing medium 10 starts in response to print data being sent from the PC 110 connected to the printer 100, as described above. The print data is generated by the printer driver.

The printer driver receives image data (such as text data and image data) from an application, converts the image data into print data in a format interpretable by the printer 100, and outputs the print data to the printer 100. When the image data from the application is converted into the print data, the printer driver carries out ink color separation processing, BRS correction processing, dot separation processing, halftone processing, control data generation processing, and the like.

Each of these kinds of processing will be described below.

Figure 4:
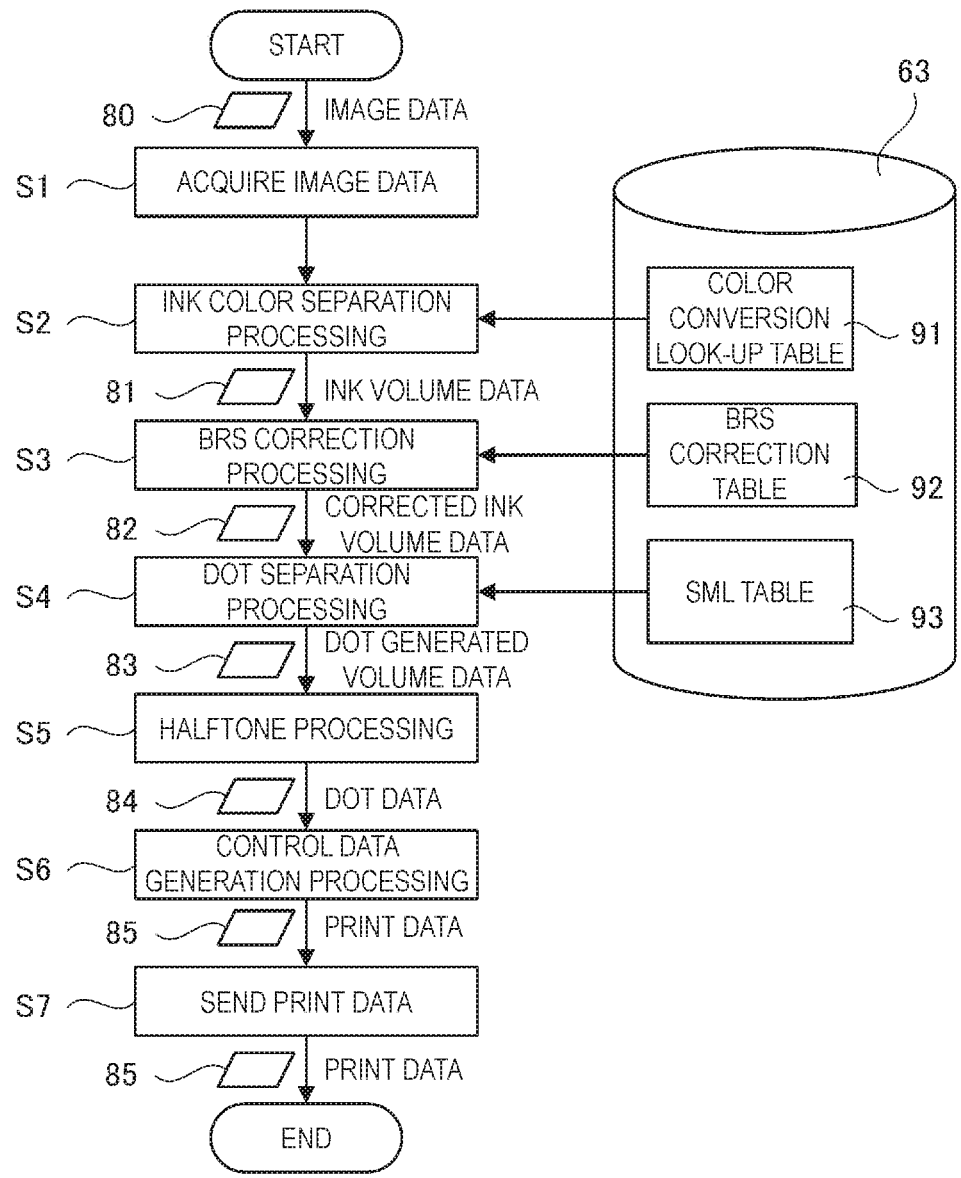
FIG. 4 is a flow chart illustrating a basic flow of image processing of generating print data.

FIG. 4 is a flow chart illustrating a basic flow of image processing of generating print data.

First, in printing, the printer driver acquires image data 80 to be subjected to printing and specified by a user (step S1).

Next, the printer driver carries out ink color separation processing of the image data 80 (step S2). The ink color separation processing is processing of separating color data (RGB multivalued data) of pixels in the image data 80 into respective ink volumes of the four colors of C, Y, M, and K. The ink color separation processing is carried out with reference to a color conversion look-up table 91. In the color conversion look-up table 91, the RGB multivalued data (combinations of RGB) being the color data of the RGB color system is correlated with the ink volume data of the four colors of C, Y, M, and K. The ink volumes of the C, Y, M, and K are represented by, for example, 8-bit density tone values (256 tone). The ink color separation processing generates ink volume data 81 of the four color ink from the image data 80.

Next, the printer driver carries out BRS correction processing of the ink volume data 81 (step S3). The BRS correction processing is processing of subjecting the ink volume data 81 for each pixel to correction based on ink discharge characteristics and array errors of the nozzles 70 with reference to the BRS correction table 92.

Figures 5, 6:
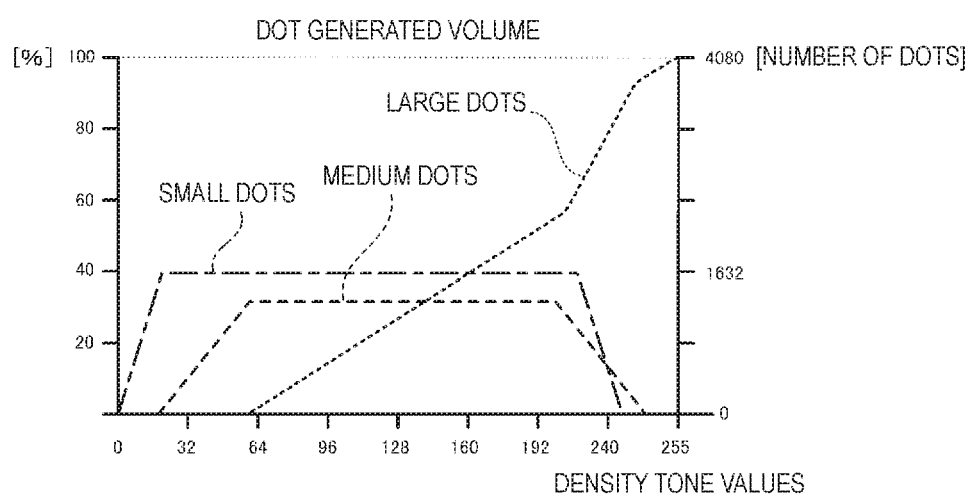
FIG. 5 is an explanatory view of a BRS correction table.
FIG. 6 is an explanatory view of an SML table.

FIG. 5 illustrates an example of the BRS correction table 92.

In the BRS correction table 92, ink volumes (density tone values) of the nozzles 70 obtained before the correction is correlated with ink volumes (density tone values) of the nozzles 70 obtained after the correction. In the BRS correction table 92 illustrated in FIG. 5, the ink volumes (density tone values) obtained before the correction are indicated in a first row. Furthermore, nozzle numbers identifying the nozzles 70 and the density tone values obtained after the correction are indicated in second and subsequent rows.

The BRS correction table 92 is prepared for each individual printer 100 and stored in the memory 63 (for example, a non-volatile storage medium such as an EEPROM) as initial data before shipment. During the preparation of the BRS correction table 92, for example, a dedicated pattern including pixels of a plurality of density tone values are printed in the four colors of C, Y, M, and K. Then, the printing results of the dedicated pattern are measured by a scanner or the like to acquire correspondence data of input values of density tone values and density tone values (output values) of the printing results. Then, input values that can derive target output values are determined for the 256 tone by processing such as linear interpolation.

In the BRS correction processing, the printer driver first identifies which nozzles 70 are to discharge the ink to carry out printing for each pixel of the ink volume data 81. Then, the printer driver refers to the data of the relevant nozzles 70 in the BRS correction table 92 and replaces the ink volumes (density tone values) obtained before the correction with the ink volumes (density tone values) obtained after the correction. Corrected ink volume data 82 is determined from the ink volume data 81 by the BRS correction processing.

Note that the BRS correction table 92 is not limited to a numerical table in which the ink volumes (density tone values) obtained before the correction correlated with the ink volumes (density tone values) obtained after the correction. The BRS correction table 92 may be a function table in which the ink volumes (density tone values) obtained after the correction is output in response to an input of the ink volumes (density tone values) obtained before the correction.

Next, the printer driver carries out dot separation processing of converting the corrected ink volume data 82 into generated volume data of ink dots on the basis of an SML table 93 (step S4).

FIG. 6 is an explanatory view of the SML table 93. FIG. 6 is a graph representing an example of the SML table 93.

In the SML table 93, the generated volumes of ink dots having three sizes of S (small dots), M (medium dots), and L (large dots) are defined with respect to the density tone values (ink volumes). The printer driver uses the SML table 93 to carry out the dot separation processing of converting the corrected ink volume data 82 into the generated volume data of ink dots. Dot generated volume data 83 of ink dots having four sizes of NULL (blank dots), S (small dots), M (medium dots), and L (large dots) is acquired by the dot separation processing.

Next, the printer driver carries out halftone processing of determining for each dot size whether dots are generated in the pixels, on the basis of the dot generated volume data 83 of the ink dots acquired by the dot separation processing (step S5). Specifically, in the dot generated volume data 83 of the ink dots acquired, data in the pixels is prepared by using a dithering method or an error diffusion method to form dispersed dots. Accordingly, dot data 84 (digitized data) in which any of the four types of ink dots including blank dots is specified is generated with respect to positions of the pixels.

Next, the printer driver assigns the dot data 84 generated by the halftone processing to the nozzles 70 of the printing heads 41C, 41M, 41Y, and 41K and carries out control data generation processing of adding command data necessary for drive control of the printing head 41 (step S6). The command data is, for example, conveying data related to conveying of the printing medium 10.

This control data generation processing generates print data 85 for causing the printer 100 to execute printing, and the printing starts in response to the generated print data 85 being sent to the printer 100 (step S7).

Correction of BRS Correction Table

In the printing system 1 including such a basic configuration, the PC 110 as the "image processing apparatus" according to this exemplary embodiment includes the input device 112 and the display device 113 as the "input unit" capable of receiving, for each of the "first ink" and the "second ink", an "ink discharge correction volume" for correcting an ink volume discharged by "predetermined nozzles" among a plurality of the "first nozzles" and a plurality of the "second nozzles", and the printer driver as the "print data generating unit" configured to generate the print data on the basis of the image data and the "ink discharge correction volume" input.

Furthermore, in this exemplary embodiment, the "predetermined nozzles" are the nozzles 70 in the overlap regions R1 to R3 (see FIG. 3) and can be subjected to correction processing of reducing uneven density (banding) of a printing image caused due to disruption of the arrays of the nozzles 70 in the overlap regions R1 to R3.

This will be described in detail below.

Correction of the ink volumes discharged by the nozzles 70 in the overlap regions R1 to R3 as the "predetermined nozzles" according to this exemplary embodiment is carried out by correcting the BRS correction table 92 described above (see FIG. 5).

The BRS correction table 92 is a table in which the ink volume (density tone value) obtained before the correction is correlated with the ink volume (density tone value) obtained after the correction for each nozzle 70, as described above. For simplicity, a density tone value obtained after the correction and before shipment of the printer 100 is hereinafter referred to as an "initial corrected value".

That is, the correction processing of reducing uneven density (banding) in a printing image caused due to disruption of the arrays of the nozzles 70 in the overlap regions R1 to R3 is processing of further correcting initial correction values of the nozzles 70 in the overlap regions R1 to R3. This correction is carried out, for example, with reference to a printing image printed by a user of the printing system 1 and a necessary degree of correction is carried out as necessary on the basis of the "ink discharge correction volume" input by the user. The carrying out a necessary degree of correction as necessary refers to carrying out more appropriate correction in accordance with a degree of uneven density (banding) observed in a printing image of connection regions printed with the nozzles 70 in the overlap regions R1 to R3 and not fully corrected by the BRS correction using the initial correction values. Furthermore, such correction can be carried out for each ink color as described below.

Input Unit

Figure 7:
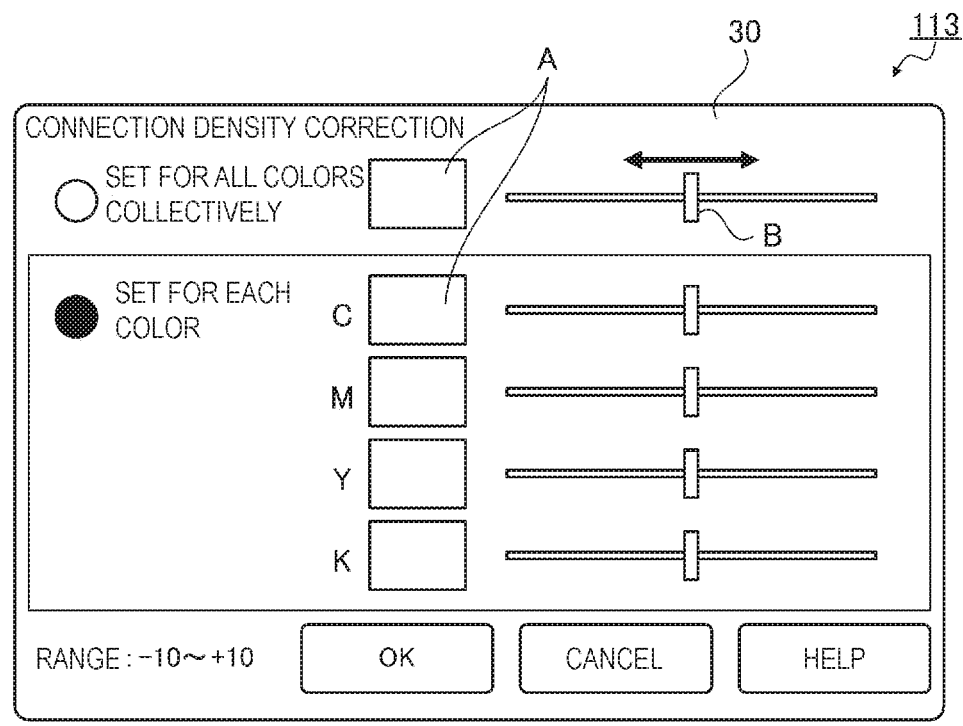
FIG. 7 is an explanatory view of a UI menu displayed by a display device in performing specification setting of correction.

FIG. 7 is an explanatory view of a user interface menu (hereinafter, referred to as a UI menu) displayed by the display device 113 in specification setting of the correction.

In printing, the input device 112 (operational keys of a keyboard and a mouse pointer) is operated in accordance with an operation menu (not illustrated (for example, a menu screen for properties of the printer 100 controlled by the printer driver)) of the printer driver displayed by the display device 113 and thus, a setting menu (connection density correction setting menu 30) for reduction processing of uneven density in the overlap regions R1 to R3 is displayed.

In the connection density correction setting menu 30, whether to carry out collective correction for all ink colors or carry out correction for each ink color can be selected. Furthermore, in each of the cases, a degree of correction can also be specified.

For example, in the case where correction is to be carried out for each ink color, "set for each color" indicated in the connection density correction setting menu 30 is selected (for example, a relevant circle is clicked with a mouse pointer) and a numerical value of from −10 to +10 indicating the degree of correction (hereinafter, referred to as a correction degree) is input to a numerical value entry field A. Besides the method of inputting the correction degree in the form of a numerical value to the numerical value entry field A, the correction degree can also be input by sliding a slider B indicated in the connection density correction setting menu 30 (for example, by dragging with a mouse pointer). The numerical value input to the numerical value entry field A is displayed in corporation with a position of the slider B.

The setting is enabled by inputting the correction degree and enabling an "OK key" (for example, clicking with a mouse pointer), and the printer driver recognizes the input information. For example, when the correction degree is "0", correction of the initial correction value of the corresponding ink color is not carried out, and a density tone value is directly correlated. A negative numerical value is correlated with correction of reducing the initial correction value. Furthermore, a positive numerical value is correlated with correction of increasing the initial correction value.

Here, the correction degree input to the connection density correction setting menu 30 is the "ink discharge correction volume". A relation between the correction degree and the correction volume for actually correcting the initial correction value of the BRS correction table 92 is determined as a designed value set in advance in consideration of characteristics for each type of ink and for each printing medium 10. Furthermore, the BRS correction table 92 is provided as individual BRS correction tables 92C, 92M, 92Y, and 92K for the printing heads 41C, 41M, 41Y, and 41K, respectively.

For example, "−2" is correlated with 98% and "−1" is correlated with 99% in the cyan ink C with respect to the printing medium 10 specific specified by the printer driver. Furthermore, "+1" is correlated with 101%, and "+2" is correlated with 102%. Furthermore, for example, "−2" is correlated with 96% and "−1" is correlated with 98% in the yellow ink Y with respect to the printing medium 10 similar. Furthermore, "+1" is correlated with 102%, and "+2" is correlated with 104%.

Note that the method of inputting the connection density correction setting menu 30 and the correction degree is not limited to such a method, and any other inputting method may be used.

FIG. 8 illustrates the BRS correction table 92A in which correction of the initial correction value is carried out.

The printer driver corrects the initial correction value defined in the BRS correction table 92 of the initial state on the basis of the set correction degree. In this case, data of the nozzles 70 disposed in the overlap regions R1 to R3 is subjected to the correction, and initial correction values of the nozzles 70 disposed in other regions are not corrected.

For example, in a case where the BRS correction table 92 illustrated in FIG. 5 is the BRS correction table 92 (92Y) of the yellow ink Y (that is, the printing head 41Y) and the nozzle corresponding to a nozzle number n in the BRS correction table 92 (92Y) is a nozzle 70 disposed in each of the overlap regions R1 to R3 (actually, as illustrated in FIG. 3, since a plurality of the nozzles 70 are disposed in the overlap regions R1 to R3, there are a plurality of nozzles corresponding to the nozzle number n), the initial correction value defined for this nozzle number n is corrected. Here, for example, when the correction degree is "−5", that is, set to 90%, and the density tone value obtained after the correction with respect to the density tone value "200" obtained before the correction is "190" (see FIG. 5), "190" is modified to "171 (=190×0.9)" (see FIG. 8). Accordingly, a new BRS correction table 92A (92AY) is generated.

Figure 9:
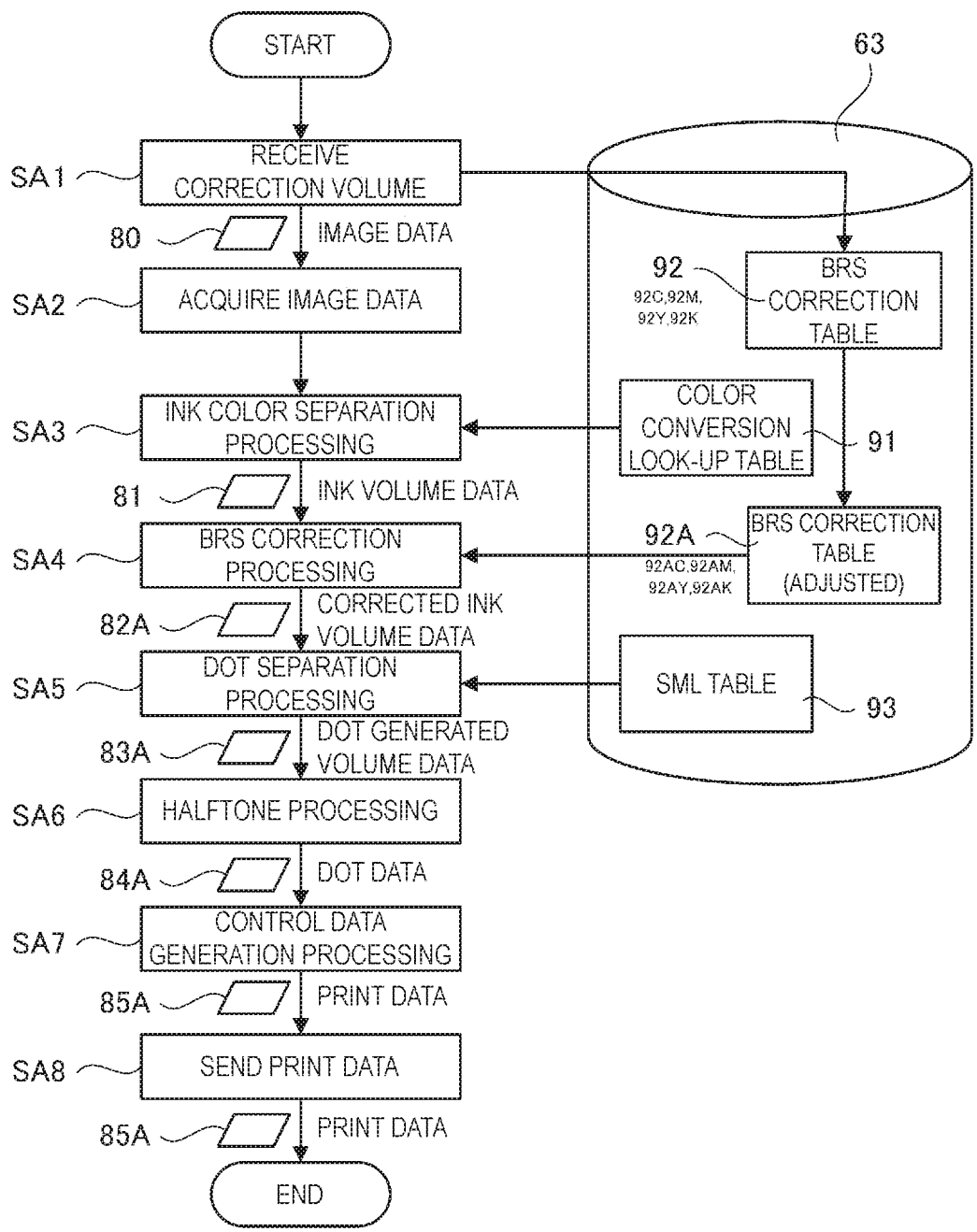
FIG. 9 is a flow chart illustrating a flow of print data generation involving correction of the BRS correction table.

FIG. 9 is a flow chart illustrating a flow of print data generation involving correction of the BRS correction table.

In carrying out corrected printing, the printer driver first causes a correction degree (ink discharge correction volume) to be set (received) for each ink color from the input unit and receives the correction degree (ink discharge correction volume) input for each ink color (step SA1). As described above, the correction degree can be set arbitrarily by a user with reference to a printing image printed in advance. The correction degree is set for each ink color and thus, the BRS correction table 92A (92AC, 92AM, 92AY, 92AK) based on the BRS correction table 92 (92C, 92M, 92Y, 92K) is generated.

Next, the printer driver acquires the image data 80 to be subjected to printing and specified by a user (step SA2).

Next, the printer driver carries out the ink color separation processing of the image data 80 (step SA3). The ink volume data 81 of the four color ink is generated from the image data 80 by the ink color separation processing.

Next, the printer driver carries out the BRS correction processing of the ink volume data 81 (step SA4). The BRS correction processing is carried out with reference to the BRS correction table 92A (92AC, 92AM, 92AY, 92AK). Corrected ink volume data 82A reflecting the correction degree set by a user for each ink color (for each of the printing heads 41C, 41M, 41Y, and 41K) with respect to the nozzles 70 in the overlap regions R1 to R3 is determined by this BRS correction processing.

Next, the printer driver carries out the dot separation processing of converting the corrected ink volume data 82A into generated volume data of ink dots on the basis of the SML table 93 (step SA5). Dot generated volume data 83A of ink dots having four sizes of NULL (blank dots), S (small dots), M (medium dots), and L (large dots) is acquired by the dot separation processing.

Next, the printer driver carries out the halftone processing of determining for each dot size whether dots are generated in the pixels, on the basis of the dot generated volume data 83A of the ink dots acquired by the dot separation processing (step SA6). Accordingly, dot data 84A (digitized data) in which any of the four types of ink dots including blank dots is specified is generated with respect to positions of the pixels.

Next, the printer driver assigns the dot data 84A generated by the halftone processing to the nozzles 70 of the printing heads 41C, 41M, 41Y, and 41K and carries out the control data generation processing of adding command data necessary for drive control of the printing head 41 (step SA7).

Print data 85A for causing the printer 100 to execute printing is generated by this control data generation processing, and the printing starts in response to the generated print data 85A being sent to the printer 100 (step SA8).

In this way, the image processing method according to this exemplary embodiment includes the step (step SA1) of receiving the ink discharge correction volume input for each ink color (for each of the first ink and the second ink) for correcting the ink volumes discharged from the nozzles 70 disposed in the overlap regions R1 to R3 (predetermined nozzles among the plurality of first nozzles and the plurality of second nozzles) and the print data generating step (steps SA2 to SA7) of generating the print data on the basis of the image data and the ink discharge correction volume input.

As described above, the image processing apparatus, the printing system, and the image processing method according to this exemplary embodiment can achieve the following effects.

In printing, since a correction value (ink discharge correction volume) for carrying out appropriate correction of uneven printing (uneven density, banding) caused by the predetermined nozzles (the nozzles 70 disposed in the overlap regions R1 to R3) can be input, correction can be carried out more accurately. Furthermore, since the ink discharge correction volume can be input for each of the first ink and the second ink (for each ink color), more appropriate correction can be carried out in accordance with characteristics of the ink.

Furthermore, since the nozzles 70 corresponding to an overlap region (connection region) in which the two head units adjacent to each other carry out printing are the predetermined nozzles to be corrected, uneven printing (uneven density, banding) such as banding caused in the overlap region can be corrected more appropriately.

Since the nozzles 70 corresponding to the overlap region are defined in advance as the predetermined nozzles to be corrected in correction of uneven printing (uneven density, banding) caused in the overlap region, it is unnecessary to set again the nozzles to be corrected and thus, correction can be carried out efficiently. Furthermore, since a correction value for carrying out appropriate correction can be input for each ink color, correction can be carried out more accurately.

Furthermore, since the printing system 1 includes the printer 100 and the PC 110 and, in printing, can receive a correction value (ink discharge correction volume) for carrying out appropriate correction of uneven printing (uneven density, banding) caused by the predetermined nozzles (nozzles 70 disposed in the overlap regions R1 to R3), correction can be carried out more accurately in printing. Furthermore, since the ink discharge correction volume can be input for each of the first ink and the second ink (for each ink color), more appropriate correction can be carried out in accordance with characteristics of the ink.

Furthermore, according to the image processing method according to this exemplary embodiment, since a correction value (ink discharge correction volume) for carrying out appropriate correction of uneven printing (uneven density, banding) caused by the predetermined nozzles (nozzles 70 disposed in the overlap regions R1 to R3) can be input in printing, correction can be carried out more accurately. Furthermore, since the ink discharge correction volume can be input for each of the first ink and the second ink (for each ink color), more appropriate correction can be carried out in accordance with characteristics of the ink.

Exemplary Embodiment 2

Next, an image processing apparatus, a printing system, and an image processing method according to exemplary embodiment 2 will be described. Note that, in the description, the same constituents as those in the exemplary embodiment described above are given the same reference signs, and redundant description of these constituents will be omitted.

In exemplary embodiment 1, the printing system 1 in which the "predetermined nozzles among the plurality of first nozzles and the plurality of second nozzles" are the "nozzles 70 disposed in the overlap regions R1 to R3 defined in advance". In exemplary embodiment 2, the predetermined nozzles are "nozzles specified by an input from an input unit". In other words, exemplary embodiment 2 is an exemplary embodiment in which a user can specify a region to be corrected and a degree of correction in accordance with a region and a state of caused uneven density (banding) that cannot be corrected fully by BRS correction processing using an initial correction value. Examples of the uneven density (banding) that cannot be corrected fully by BRS correction processing using an initial correction value can be considered to include uneven density caused by a difference in ink discharge characteristics of specific head units or nozzles 70 specific, uneven density exhibited due to degradation over time, and uneven density first exhibited under a usage environment of a user (such as a state of environmental temperature).

Specific examples will be described below.

Example 1

In a printing system 1 according to example 1, predetermined nozzles to be corrected are nozzles corresponding to a specific overlap region selected from a plurality of first overlap regions and a plurality of second overlap regions based on an input from an input unit (input device 112, display device 113).

Figure 10:
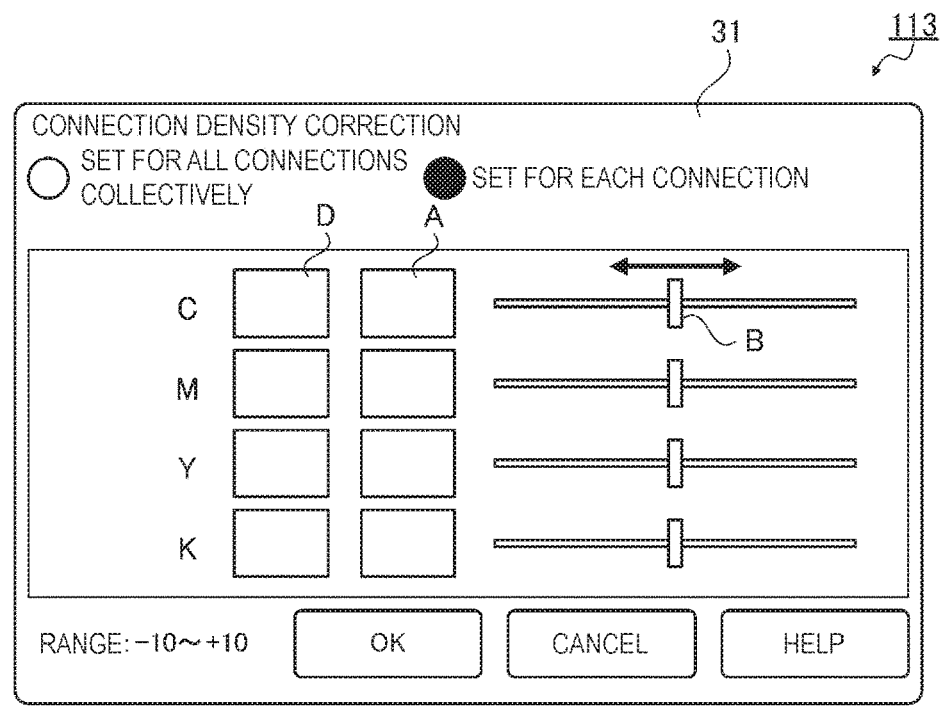
FIG. 10 is an explanatory view of a UI menu displayed by an image processing apparatus according to example 1.

FIG. 10 is an explanatory view of a UI menu (connection density correction setting menu 31) displayed by an image processing apparatus (PC 110) according to example 1 in specification setting of correction.

In printing, the input device 112 (operational keys of a keyboard and a mouse pointer) is operated in accordance with an operation menu of a printer driver displayed by the display device 113 and thus, a setting menu (connection density correction setting menu 31) for reduction processing of uneven density in overlap regions R1 to R3 is displayed.

In the connection density correction setting menu 31, whether to carry out collective correction of all connections (that is, all of the nozzles 70 disposed in the overlap regions R1 to R3) or carry out exclusive correction of the range of the nozzles 70 disposed for each overlap region R. Furthermore, in each of the cases, a degree of correction can also be specified.

For example, in the case where correction is to be carried out for each overlap region R, "set connections individually" indicated in the connection density correction setting menu 31 is selected, a number n (n=1 to 3 in the case of the printing head 41 illustrated in FIG. 3) of an overlap region Rn of an ink color (printing head 41) to be corrected is input to a numerical value entry field D, and a correction degree is input to a numerical value entry field A. Besides the method of inputting the correction degree in the form of a numerical value to the numerical value entry field A as with exemplary embodiment 1, the correction degree can also be input by sliding a slider B indicated in a connection density correction setting menu 30. The numerical value input to the numerical value entry field A is displayed in corporation with a position of the slider B.

The setting is enabled by inputting to the numerical value entry field D and the numerical value entry field A and enabling an "OK key". To specify a plurality of overlap regions R to be corrected with respect to the same ink color (printing head 41), an input to the numerical value entry field D and the numerical value entry field A is repeated.

Note that when a user determines an overlap region R to be corrected with reference to an image printed, the user needs to be able to readily learn information on whether uneven density (banding) is caused in an overlap region R and which overlap region R (of which number) has uneven density caused. In this regard, for example, it is preferred to provide a gauge on which a position of the overlap region Rn is marked to match a length in a width direction of a printing medium 10.

Furthermore, in the case where collective correction of all connection regions is carried out in the connection density correction setting menu 31, the "set all connections collectively" indicated in the connection density correction setting menu 31 is selected, and the correction degree of the ink color (printing head 41) to be corrected is input to the numerical value entry field A. In this case, since it is unnecessary to input the number n of the overlap region Rn, display (for example, gray display or deletion of the numerical value entry field D) indicating that a numerical value cannot be input appears in the numerical value entry field D.

Figure 11:
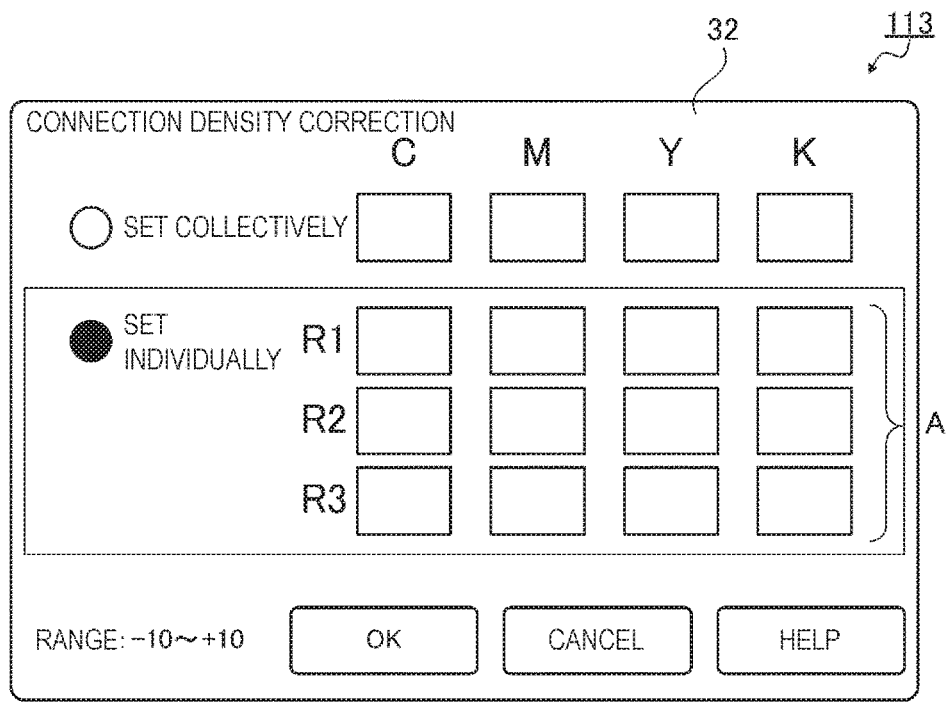
FIG. 11 is an explanatory view of another UI menu displayed by the image processing apparatus according to example 1.

The UI menu corresponding to example 1 is not limited to the connection density correction setting menu 31. For example, the UI menu may be a UI menu such as the head-unit density correction setting menu 32 illustrated in FIG. 11. In the head-unit density correction setting menu 32, setting with the slider B cannot be carried out, but the correction degree can be input to the numerical value entry field A provided for each overlap region Rn and thus, an input of the correction degrees with respect to all of the overlap regions Rn can be carried out in the same UI menu.

According to example 1 of this exemplary embodiment, the predetermined nozzles to be corrected are the nozzles 70 corresponding to an overlap region selected from the plurality of first overlap regions and the plurality of second overlap regions based on an input from the input unit (input device 112, display device 113). That is, in the case where a printing image includes printing images of a plurality of overlap regions, an overlap region determined to need correction is selected, and appropriate correction can be executed.

Example 2

In a printing system 1 according to example 2, predetermined nozzles to be corrected are "nozzles of a specific head unit selected from a plurality of first head units and a plurality of second head units based on an input from an input unit (input device 112, display device 113)".

Figure 12:
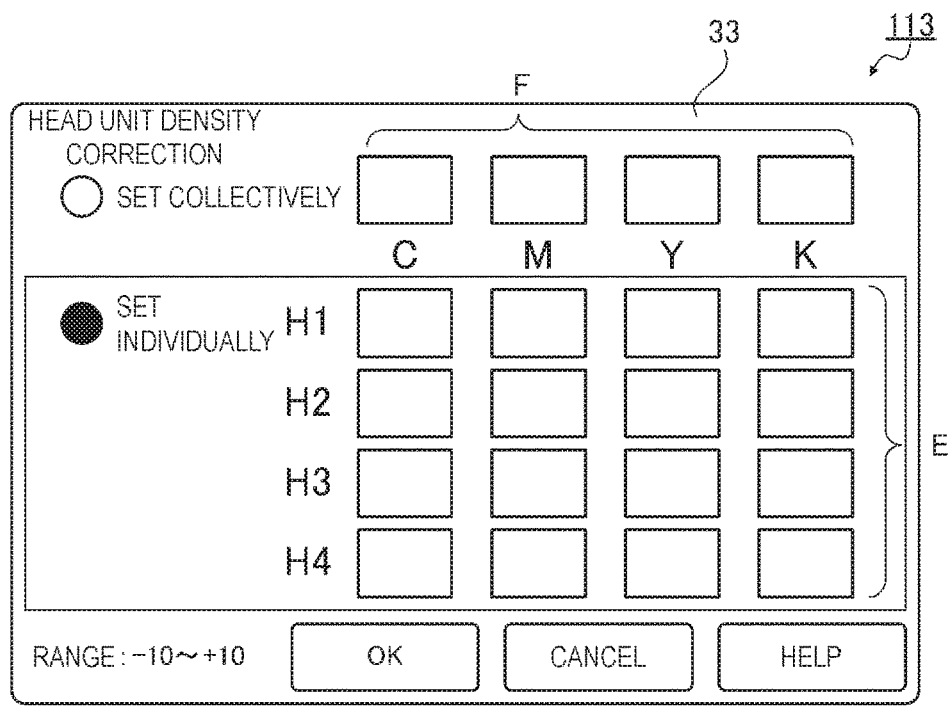
FIG. 12 is an explanatory view of a UI menu displayed by an image processing apparatus according to example 2.

FIG. 12 is an explanatory view of a UI menu (head-unit density correction setting menu 33) displayed by an image processing apparatus (PC 110) according to example 2 in specification setting of correction.

In printing, an input device 112 is operated in accordance with an operation menu of the printer driver displayed by the display device 113 and thus, a setting menu (head-unit density correction setting menu 33) for reduction processing of uneven density caused by a specific head unit is displayed.

In the head-unit density correction setting menu 33, whether to carry out collective correction of all head units (four head units 411 to 414 in the example illustrated in FIG. 3) of a specific ink color for each ink color (for each of printing heads 41C, 41M, 41Y, and 41K), or carry out correction of a specific head unit can be selected. In each of the cases, a degree of correction can also be specified.

For example, in the case of carrying out correction of a specific head unit, "set individually" indicated in the head-unit density correction setting menu 33 is selected, and a correction degree is input to a numerical value entry field E of a head unit Hn (n=1 to 4 in the case of the head units 411 to 414 illustrated in FIG. 3) to be corrected of an ink color (printing head 41) to be corrected. The setting is enabled by completing the input to the numerical value entry field E and enabling an "OK key".

Furthermore, in the case of carrying out collective correction of all head units of a specific ink color in the head-unit density correction setting menu 33, "set collectively" indicated in the head-unit density correction setting menu 33 is selected, and the correction degree of the ink color to be corrected is input to a numerical value entry field F. In this case, since an input to the numerical value entry field E is unnecessary, display (for example, gray display or deletion of the numerical value entry field E) indicating that a numerical value cannot be input appears in the numerical value entry field E.

According to example 2 of this exemplary embodiment, since the predetermined nozzles to be corrected are the nozzles 70 of a head unit selected from the plurality of first head units and the plurality of second head units based on an input from the input unit, uneven printing such as banding that depends on a head unit and that cannot be corrected fully by BRS correction processing using an initial correction value can be corrected more appropriately by, for example, selecting a head unit determined to have different (changed) characteristics in a usage environment of a user and to need correction, and executing correction.

Example 3

In a printing system 1 according to example 3, predetermined nozzles to be corrected are "any nozzles specified by an input from an input unit (input device 112, display device 113)".

Figure 13:
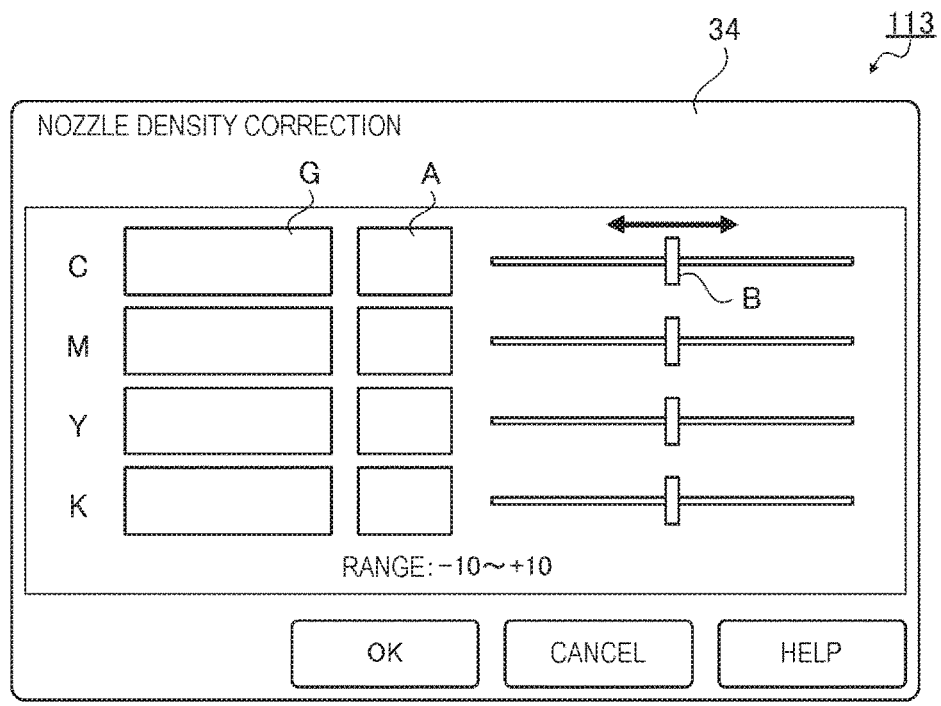
FIG. 13 is an explanatory view of a UI menu displayed by an image processing apparatus according to example 3.

FIG. 13 is an explanatory view of a UI menu (nozzle density correction setting menu 34) displayed by an image processing apparatus (PC 110) according to example 3 in specification setting of correction.

In printing, the input device 112 is operated in accordance with an operation menu of a printer driver displayed by the display device 113 and thus, a setting menu (nozzle density correction setting menu 34) for reduction processing of uneven density caused by specific nozzles 70 is displayed.

In the nozzle density correction setting menu 34, numbers of the nozzles 70 to be corrected can be specified for each ink color (for each of printing heads 41C, 41M, 41Y, and 41K). Furthermore, a degree of correction can be specified.

The numbers of the nozzles 70 are set in advance to be consecutive numbers in order along an extending direction of head units 411 to 414, and can be correlated with the actual nozzles 70. Specifically, for example, as with the head units 411 to 414 illustrated in FIG. 3, in a case where each of the head units 411 to 414 include 24 nozzles 70, the nozzle numbers of the nozzles 70 of the head unit 411 are 1 to 24, the nozzle numbers of the nozzles 70 of the head unit 412 are 25 to 48, the nozzle numbers of the nozzles 70 of the head unit 413 are 49 to 72, and the nozzle numbers of the nozzles 70 of the head unit 414 are 73 to 96.

A plurality of numbers of the nozzles 70 to be corrected can be specified by inputting individual number specification (l, m, n, . . . ) or consecutive number specification (m to n) to a numerical value entry field G. Furthermore, correction degrees with respect to the nozzles 70 specified are input to a numerical value entry field A. Besides the method of inputting the correction degree in the form of a numerical value to the numerical value entry field A as with exemplary embodiment 1, the correction degree can also be input by sliding a slider B indicated in a connection density correction setting menu 30.

The setting is enabled by completing the input to the numerical value entry field G and the numerical value entry field A and enabling an "OK key".

Note that when a user determines the nozzles 70 to be corrected with reference to an image printed, the user needs to be able to readily lean information on which nozzles 70 (of which numbers) are to be corrected. In this regard, for example, it is preferred to provide a gauge on which a position of the nozzle number (position serving as a guide) is marked to match a length in a width direction of a printing medium 10.

According to example 3 of this exemplary embodiment, since the predetermined nozzles to be corrected are the nozzles 70 specified by an input from the input unit, uneven printing such as banding caused at any position can be corrected.

Exemplary Embodiment 3

Next, an image processing apparatus, a printing system, and an image processing method according to exemplary embodiment 3 will be described. Note that, in the description, the same constituents as those in the exemplary embodiments described above are given the same reference signs, and redundant description of these constituents will be omitted.

In the printing system 1 according to exemplary embodiment 3, a print data generating unit (print driver) of a PC 110 generates print data on the basis of a plurality of ink discharge correction volumes input in accordance with image data and an ink volume per unit area of ink discharged on a print medium 10.

Figure 14:
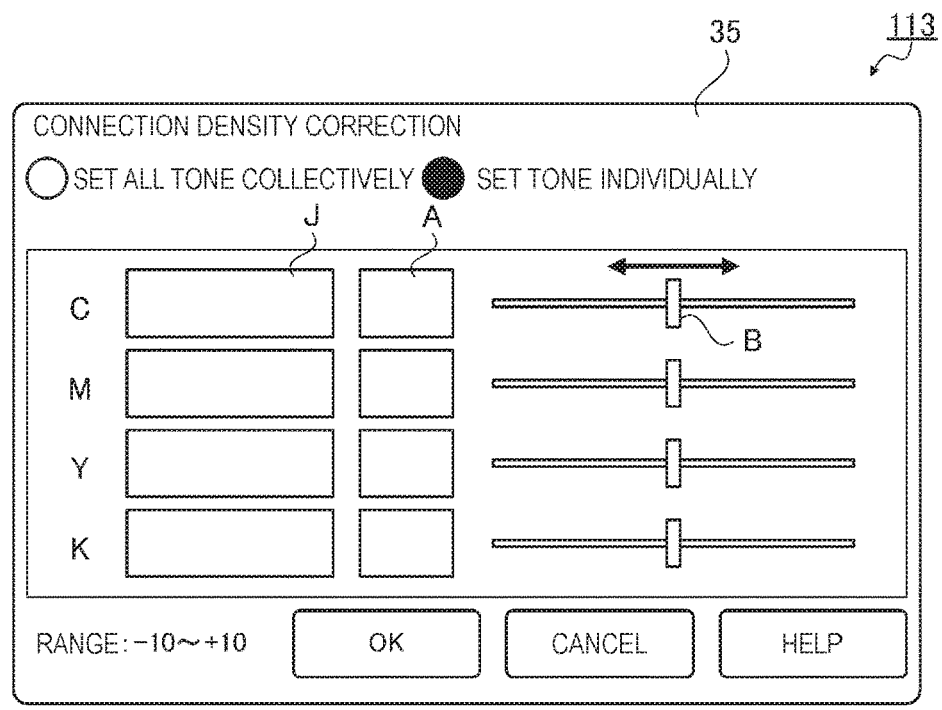
FIG. 14 is an explanatory view of a UI menu displayed by an image processing apparatus according to exemplary embodiment 3.

FIG. 14 is an explanatory view of a UI menu (connection density correction setting menu 35) displayed by an image processing apparatus (PC 110) according to this exemplary embodiment in specification setting of correction.

In printing, an input device 112 is operated in accordance with an operation menu of the printer driver displayed by a display device 113 and thus, a setting menu (connection density correction setting menu 35) for reduction processing of uneven density exhibited in a specific tone range or different degrees of uneven density depending on tone is displayed.

Note that the "tone" refers to density of a printing image and corresponds to the ink volume per unit area of ink discharged onto the printing medium 10.

In the connection density correction setting menu 35, ink density (ink volume per unit area of ink discharged on the printing medium 10) to be corrected can be specified for each ink color. Furthermore, a degree of correction can be specified.

The specification of the ink density to be corrected is carried out by a method of specifying density levels set in advance (for example, five levels such as faint, slightly faint, medium, slightly dark, and dark) or a method of specifying a tone value (for example, values from 0 to 255) or the range of tone values (for example, values in the range of 0 to 255).

The ink density to be corrected can be specified by inputting the ink density to a density entry field J. Furthermore, the correction degree with respect to the ink density specified is input to a numerical value entry field A. Besides the method of inputting the correction degree in the form of a numerical value to the numerical value entry field A as with exemplary embodiment 1, the correction degree can also be input by sliding a slider B indicated in a connection density correction setting menu 30.

The setting is enabled by completing the input to the density entry field J and the numerical value entry field A and enabling an "OK key".

Figure 15:
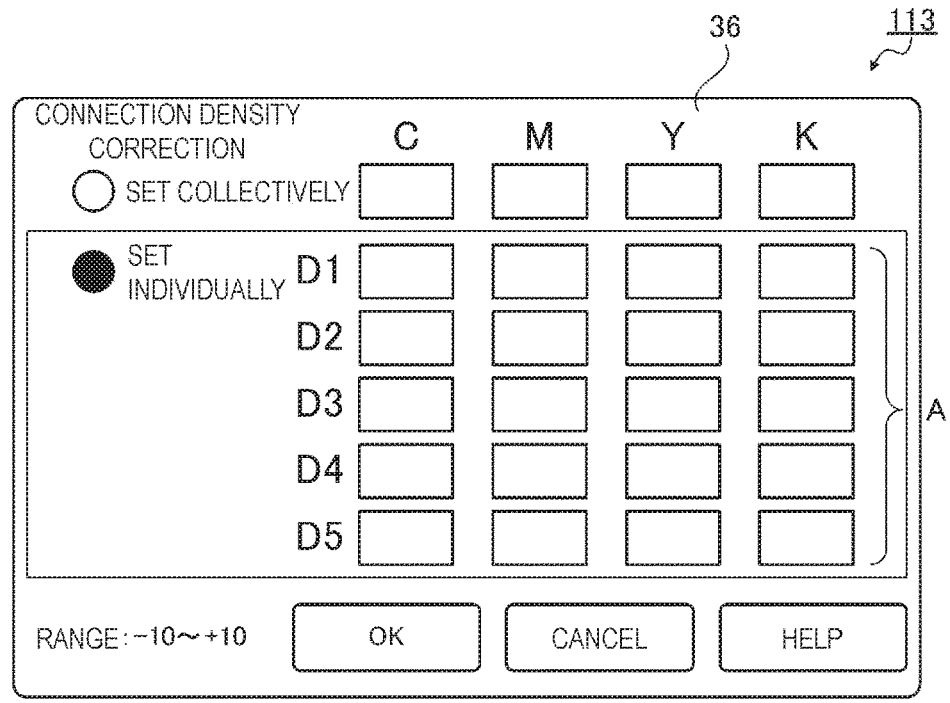
FIG. 15 is an explanatory view of another UI menu displayed by the image processing apparatus according to exemplary embodiment 3.

The UI menu corresponding to this exemplary embodiment is not limited to the connection density correction setting menu 35. For example, the UI menu may be a UI menu such as the connection density correction setting menu 36 illustrated in FIG. 15. In the connection density correction setting menu 36, setting with the slider B cannot be carried out, but the correction degree can be input to the numerical value entry field A provided for each density level set in advance (D1 to D5 respectively corresponding to faint, slightly faint, medium, slightly dark, and dark as described above).

According to this exemplary embodiment, the print data generating unit (print driver) generates print data on the basis of the plurality of ink discharge correction volumes input in accordance with the image data and the ink volume per unit area of ink discharged on the print medium 10. Thus, for example, in a case where a necessary degree of correction differs depending on tone of a printing image, more appropriate correction can be carried out in accordance with the tone of the printing image.

Modification

Note that the invention is not limited to the exemplary embodiments described above, and various modifications and improvements can be made on the exemplary embodiments described above.

Figure 16:
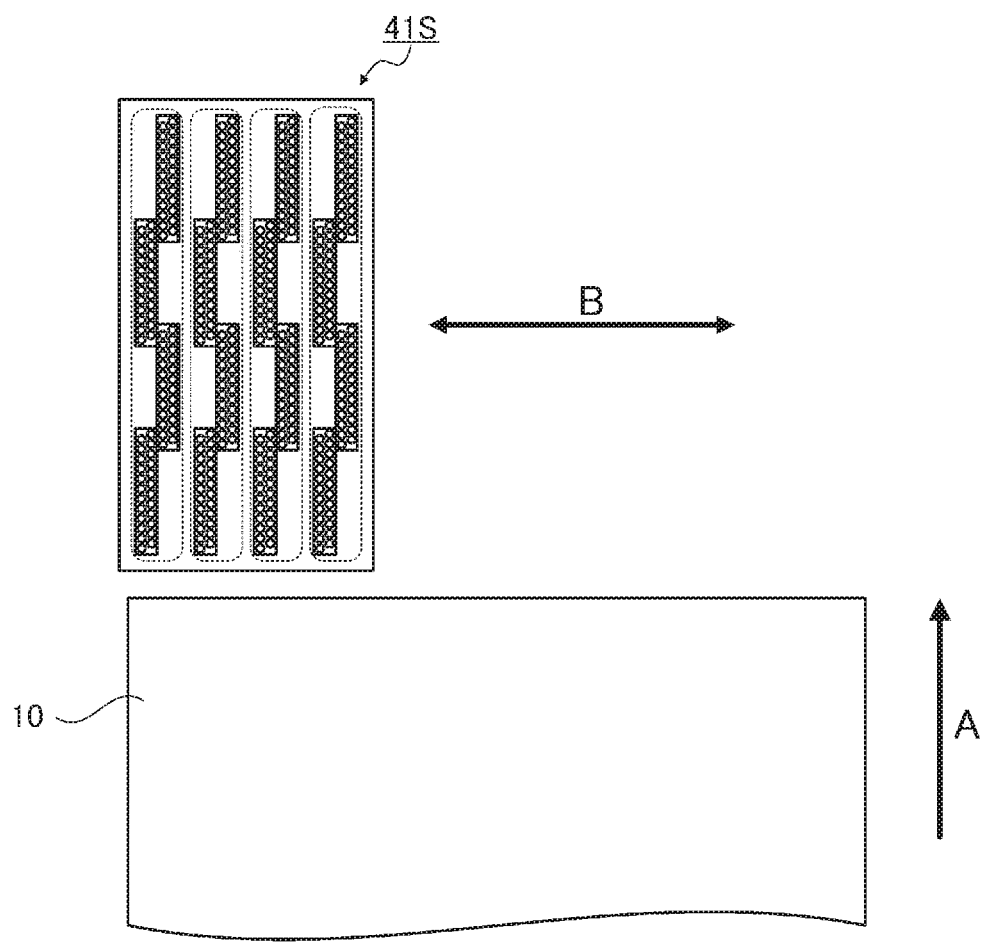
FIG. 16 is an explanatory view of a printing head according to a modification.

For example, the configuration of the printing unit 40 is not limited to a line head such as the printing head 41 illustrated in FIG. 3, and may include a serial head such as a printing head 41S illustrated in FIG. 16. The printing head 41S is a printing head smaller in size than the printing head 41, and is provided in a direction obtained by rotating the printing head 41 by 90 degrees.

That is, the printing apparatus is not limited to a line printer such as the printer 100 according to exemplary embodiment 1, and may be a serial printer including a carriage configured to move the printing head 41S for scanning in a sheet-width direction B with respect to the printing medium 10, and the serial printer is configured to carry out printing by repeating a pass operation of discharging ink droplets from the nozzles to the printing medium 10 during a scanning operation to form dot rows in the sheet-width direction B, and a conveying operation of moving the printing medium 10 in a conveying direction A.

Even in a printing system including a serial printer including a serial head such as the printing head 41S, the same effects can be obtained by the configuration in which a user can specify a region to be corrected and a degree of correction in accordance with a region and a state of caused uneven density (banding) that cannot be corrected fully by BRS correction processing using an initial correction value.

This application claims priority under 35 U.S.C. § 119 to Japanese Patent Application No. 2017-235822, filed Dec. 8, 2017. The entire disclosure of Japanese Patent Application No. 2017-235822 is hereby incorporated herein by reference.

What is claimed is:

1. An image processing apparatus configured to generate, based on image data corresponding to a printing image, print data for causing a printing apparatus to execute printing, the printing apparatus including a first printing head including a plurality of first nozzles configured to discharge onto a printing medium first ink for carrying out printing of the printing image and a second printing head including a plurality of second nozzles configured to discharge onto the printing medium second ink for carrying out the printing, the image processing apparatus comprising:
    an input unit configured to independently receive, for each of the first ink and the second ink, an ink discharge correction volume for correcting an ink volume discharged by predetermined nozzles among the plurality of first nozzles and the plurality of second nozzles; and
    a print data generating unit configured to generate the print data based on the image data and the ink discharge correction volume input.

2. The image processing apparatus according to claim 1, wherein the predetermined nozzles to be corrected are nozzles specified by an input from the input unit.

3. The image processing apparatus according to claim 1 wherein,
    the first printing head provided in the printing apparatus and to be corrected includes a plurality of first head units including the plurality of first nozzles,
    the second printing head provided in the printing apparatus and to be corrected includes a plurality of second head units including the plurality of second nozzles, and
    the predetermined nozzles to be corrected are nozzles corresponding to a first overlap region in which print regions where the first head units adjacent to each other carry out printing overlap each other and a second overlap region in which print regions where the second head units adjacent to each other carry out printing overlap each other.

4. The image processing apparatus according to claim 3, wherein the predetermined nozzles to be corrected are nozzles corresponding to an overlap region selected from a plurality of the first overlap regions and a plurality of the second overlap regions based on an input from the input unit.

5. The image processing apparatus according to claim 1 wherein,
    the first printing head provided in the printing apparatus and to be corrected includes a plurality of first head units including the plurality of first nozzles,
    the second printing head provided in the printing apparatus and to be corrected includes a plurality of second head units including the plurality of second nozzles, and
    the predetermined nozzles to be corrected are nozzles of a head unit selected from the plurality of first head units and the plurality of second head units based on an input from the input unit.

6. The image processing apparatus according to claim 1, wherein the print data generating unit generates the print data based on the image data and a plurality of the ink discharge correction volumes input in accordance with an ink volume per unit area of the ink discharged onto the printing medium.

7. A printing system comprising:
    a printing apparatus including a first printing head including a plurality of first nozzles configured to discharge onto a printing medium first ink for carrying out printing of a printing image and a second printing head including a plurality of second nozzles configured to discharge onto the printing medium second ink for carrying out the printing; and
    an image processing apparatus configured to generate print data for causing the printing apparatus to execute printing based on image data corresponding to the printing image, wherein
    the image processing apparatus includes
    an input unit configured to independently receive, for each of the first ink and the second ink, an ink discharge correction volume for correcting an ink volume discharged by predetermined nozzles among the plurality of first nozzles and the plurality of second nozzles, and
    a print data generating unit configured to generate the print data based on the image data and the ink discharge correction volume input.

8. An image processing method of generating, based on image data corresponding to a printing image, print data for causing a printing apparatus to execute printing, the printing apparatus including a first printing head including a plurality of first nozzles configured to discharge onto a printing medium first ink for carrying out printing of the printing image and a second printing head including a plurality of second nozzles configured to discharge onto the printing medium second ink for carrying out the printing, the image processing method comprising:
    receiving an ink discharge correction volume for correcting an ink volume discharged from predetermined nozzles among the plurality of first nozzles and the plurality of second nozzles, the ink discharge correction volume being input independently for each of the first ink and the second ink; and
    generating the print data based on the image data and the ink discharge correction volume received.

* * * * *